United States Patent
Hutchison et al.

(10) Patent No.: US 7,425,227 B1
(45) Date of Patent: Sep. 16, 2008

(54) PLEATED FILTER ELEMENT WITH OFFSET EMBOSS PATTERN

(75) Inventors: Christopher D. Hutchison, Gastonia, NC (US); Brian T. Lee, York, SC (US)

(73) Assignee: Wix Filtration Corp LLC, Gastonia, NC (US)

( * ) Notice: Subject to any disclaimer, the term of this patent is extended or adjusted under 35 U.S.C. 154(b) by 284 days.

(21) Appl. No.: 11/152,240

(22) Filed: Jun. 15, 2005

Related U.S. Application Data

(60) Provisional application No. 60/580,250, filed on Jun. 17, 2004.

(51) Int. Cl.
*B01D 39/00* (2006.01)
*B01D 46/00* (2006.01)
*B01D 59/50* (2006.01)
*B01D 50/00* (2006.01)

(52) U.S. Cl. .......................... 55/521; 55/497; 55/385.3; 55/489

(58) Field of Classification Search .................. 55/497, 55/385.3, 489
See application file for complete search history.

(56) References Cited

U.S. PATENT DOCUMENTS

| | | | |
|---|---|---|---|
| 2,063,743 A | 12/1936 | Kamrath | |
| 2,135,863 A | 11/1938 | Walker | |
| 2,646,887 A | 7/1953 | Robinson et al. | |
| 2,784,802 A | 3/1957 | Bub et al. | |
| 2,908,350 A | 10/1959 | Buckman | |
| 2,936,855 A | 5/1960 | Allen et al. | |
| 2,942,732 A | 6/1960 | Edelen | |
| 2,945,559 A | 7/1960 | Buckman | |
| 3,198,336 A | 8/1965 | Hyslop | |
| 3,386,232 A | 6/1968 | Gaines, Jr. | |
| 3,531,920 A | 10/1970 | Hart | |
| 3,799,354 A | 3/1974 | Buckman et al. | |
| 3,807,150 A | 4/1974 | Maracle | |
| 4,268,290 A | 5/1981 | Barrington | |
| 4,452,619 A | 6/1984 | Wright et al. | |
| 4,668,393 A | 5/1987 | Stone | |
| 4,692,245 A | 9/1987 | Church et al. | |
| 5,053,131 A | 10/1991 | Lippold | |
| 5,066,400 A | 11/1991 | Rocklitz et al. | |
| 5,244,571 A | 9/1993 | Church et al. | |

(Continued)

FOREIGN PATENT DOCUMENTS

DE    3043232    6/1981

(Continued)

*Primary Examiner*—Walter D. Griffin
*Assistant Examiner*—Amber Miller Harris
(74) *Attorney, Agent, or Firm*—Honigman Miller Schwartz & Cohn LLP

(57) ABSTRACT

A pleated fluid filter element for removing particulate matter from a fluid stream that comprises a pleated filter media provided with a plurality of pleats having peaks and valleys and having a clean and dirty side. The pleated filter media further has arrays of elongated embossments projecting from both the clean and dirty sides thereof. The arrays of the elongated embossments are positioned so that the elongated embossments embossed on adjacent pleats of the filter media are offset from each other in a direction parallel to the peaks and valleys. The elongated embossments are provided for maintaining gaps between the pleats and spaces within the pleats and for channeling fluid into and out of the filter media.

20 Claims, 9 Drawing Sheets

U.S. PATENT DOCUMENTS

| | | | |
|---|---|---|---|
| 5,306,321 | A | 4/1994 | Osendorf |
| 5,346,519 | A * | 9/1994 | Williams ................... 55/489 |
| 5,362,390 | A | 11/1994 | Widenhoefer et al. |
| 5,609,761 | A * | 3/1997 | Franz ................... 210/493.1 |
| 5,643,446 | A | 7/1997 | Clausen et al. |
| 5,674,302 | A | 10/1997 | Nakayama et al. |
| 5,733,443 | A | 3/1998 | Stamey, Jr. et al. |
| 5,766,290 | A | 6/1998 | Zievers et al. |
| 5,770,065 | A | 6/1998 | Popoff et al. |
| 5,853,438 | A | 12/1998 | Igarashi |
| 5,888,262 | A | 3/1999 | Kahler |
| 6,045,597 | A | 4/2000 | Choi |
| 6,053,334 | A | 4/2000 | Popoff et al. |
| 6,113,781 | A | 9/2000 | Popoff et al. |
| 6,165,241 | A | 12/2000 | Choi |
| 6,171,491 | B1 | 1/2001 | Popoff et al. |
| 6,200,465 | B1 | 3/2001 | Carawan et al. |
| 6,315,805 | B1 | 11/2001 | Strauss |
| 6,336,946 | B1 | 1/2002 | Adams et al. |
| 6,361,577 | B1 | 3/2002 | Unrath et al. |
| 6,375,700 | B1 | 4/2002 | Jaroszczyk et al. |
| 6,402,800 | B1 | 6/2002 | Rey |
| 6,780,217 | B1 * | 8/2004 | Palmer ................... 55/502 |
| 6,824,581 | B1 | 11/2004 | Tate et al. |
| 6,997,969 | B1 | 2/2006 | Horst et al. |
| 7,122,068 | B2 * | 10/2006 | Tate et al. ................... 55/497 |
| 2003/0075500 | A1 | 4/2003 | Kleingunther et al. |

FOREIGN PATENT DOCUMENTS

| | | |
|---|---|---|
| DE | 3815145 | 10/1989 |
| EP | 1 254 689 A1 | 11/2002 |
| WO | WO-93/02769 | 2/1993 |

\* cited by examiner

PLEATED FILTER ELEMENT WITH OFFSET EMBOSS PATTERN

CROSS-REFERENCE TO RELATED APPLICATION

This application claims the benefit under 35 U.S.C. 119(e) of U.S. Provisional Application No. 60/580,250 filed Jun. 17, 2004 by Hutchison et al. and is incorporated herein by reference.

BACKGROUND OF THE INVENTION

1. Field of the Invention

The present invention relates to pleated filter elements for filtering fluids, and more specifically a pleated filter element provided with arrays of elongated embossments arranged in an offset pattern.

2. Description of the Prior Art

Fluid filters are well known devices in which a flow of fluid (such as air, oil, fuel, etc.) is drawn or forced into a housing and caused to pass through a filter media configured to remove dirt, dust and other particles entrained in the fluid flow. The fluid flow cleaned by the filter is thereafter used in devices such as internal combustion engines.

A filter element is disposed in a filter housing between a fluid inlet and a fluid outlet. Generally, a seal is positioned to seal the fluid inlet from the fluid outlet so that all fluid passing out of the outlet has been passed through the filter element. For most automotive applications, the filter element is conventionally constructed of pleated paper with pleats facing upstream toward the fluid stream inlet and downstream toward the fluid stream outlet. These filters may be of the cylindrical, frustoconical or panel configuration. Many light duty air filters used in automotive applications to filter inlet air for internal combustion engines include substantially rectangular filter element panels to filter the high velocity air consumed by the engines. Typically, oil and fuel filters used in automotive applications to filter inlet oil and fuel for internal combustion engines include substantially cylindrical filter elements. Usually, the fluid filters configured of pleated media filter elements have substantially similar pleats.

Currently, there is a need to increase dirt holding capacity of the fluid filters while reducing fluid low restriction. In order to conserve space in engine compartments, panel air filters are now being employed, but panel air filters have encountered the aforementioned problems of reduced dirt holding capacity and relatively high restriction.

Typically, filter elements having pleated filter media include spacer arrangements between panels of the media for filtering particulate bearing fluid streams. However, the spacers tend to be inserted elements which increases the cost of filter media and can compromise the reliability of the filter media. This is because inserted spacers can become dislodged and damage the filter media if on the upstream or dirty side of the filter media. If on the clean side of the filter media, the spacers can become dislodged and possibly damage the machinery served by the filter media.

Therefore, a need exists to develop improved pleated fluid filter elements with increased dirt holding capacity and reduced fluid low restriction that advance the art.

SUMMARY OF THE INVENTION

The present invention provides a new and improved pleated fluid filter element for removing particulate matter from a fluid stream.

The pleated fluid filter element in accordance with the present invention comprises a pleated filter media provided with a plurality of pleats having peaks and valleys and having a clean and dirty side. The pleated filter media further has arrays of elongated embossments projecting from both the clean and dirty sides thereof. The arrays of the elongated embossments are positioned so that the elongated embossments embossed on adjacent pleats of the filter media are offset from each other in a direction parallel to the peaks and valleys. The elongated embossments are provided for maintaining gaps between the pleats and spaces within the pleats and for channeling fluid into and out of the filter media.

Upon further study of the specification and appended claims, further features and advantages of this invention will become apparent to those skilled in the art.

BRIEF DESCRIPTION OF THE DRAWINGS

Objects and advantages of the invention will become apparent from a study of the following specification when viewed in light of the accompanying drawings, wherein.

DESCRIPTION OF PREFERRED EMBODIMENT

The preferred embodiment of the present invention will now be described with the reference to accompanying drawings. As used herein, the words "top" and "bottom" in the following description are referred with respect to a direction of a fluid flow, as indicated in the accompanying drawing figures by arrows 38 and 48.

Figure 1:
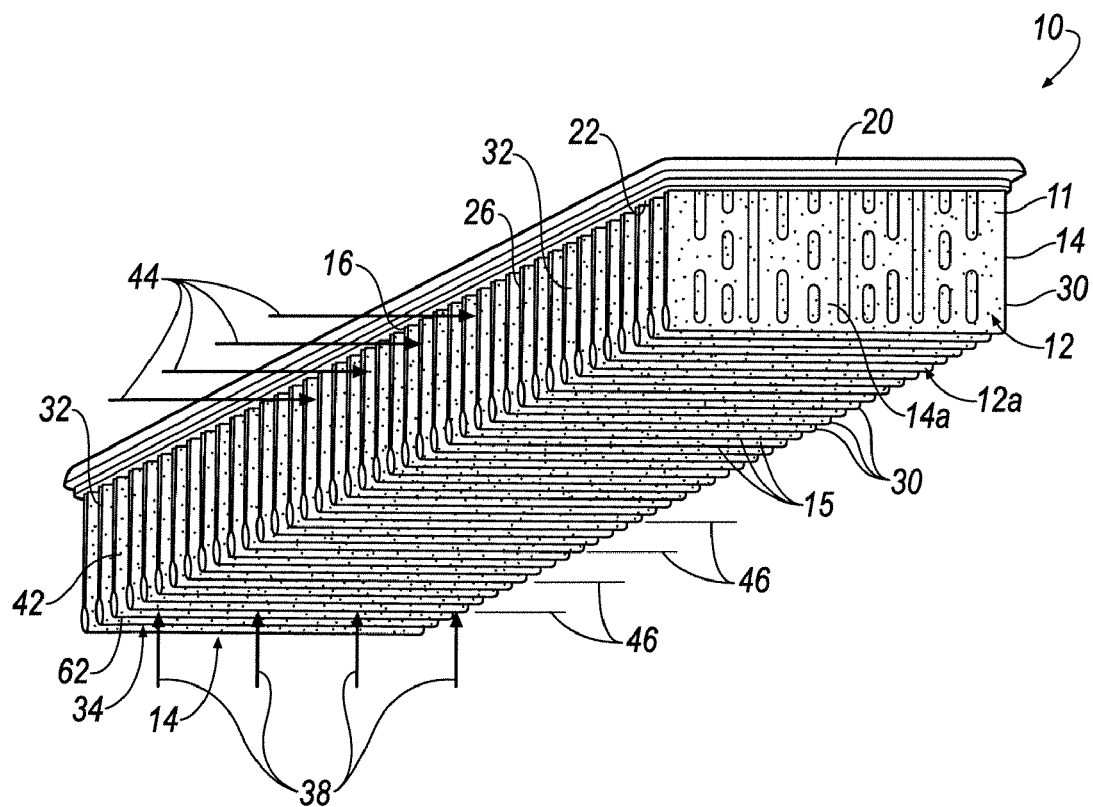
FIG. 1 is a bottom perspective view of a filter element in accordance with the first exemplary embodiment of the present invention.
Figure 2:
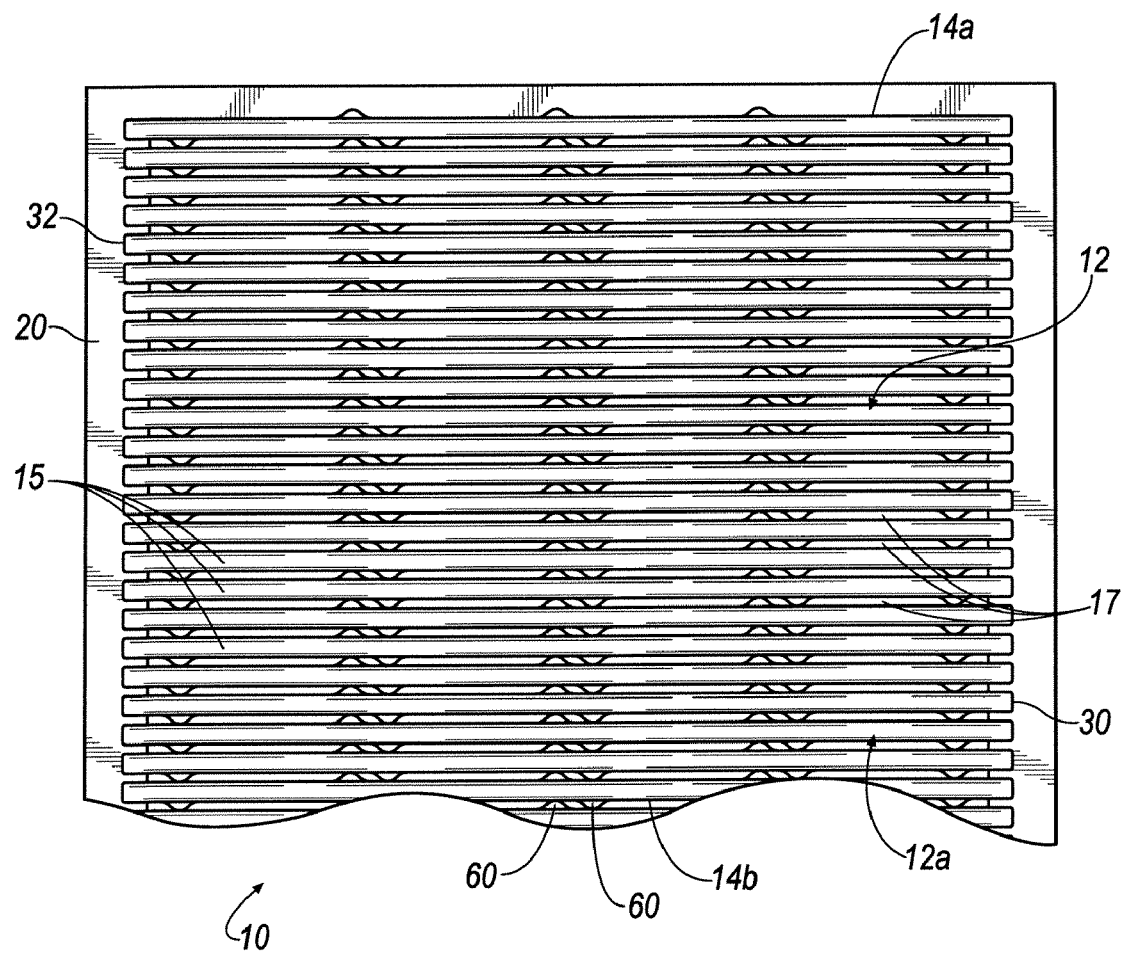
FIG. 2 is a bottom planar view of the filter element in accordance with the first exemplary embodiment of the present invention.
Figure 3:
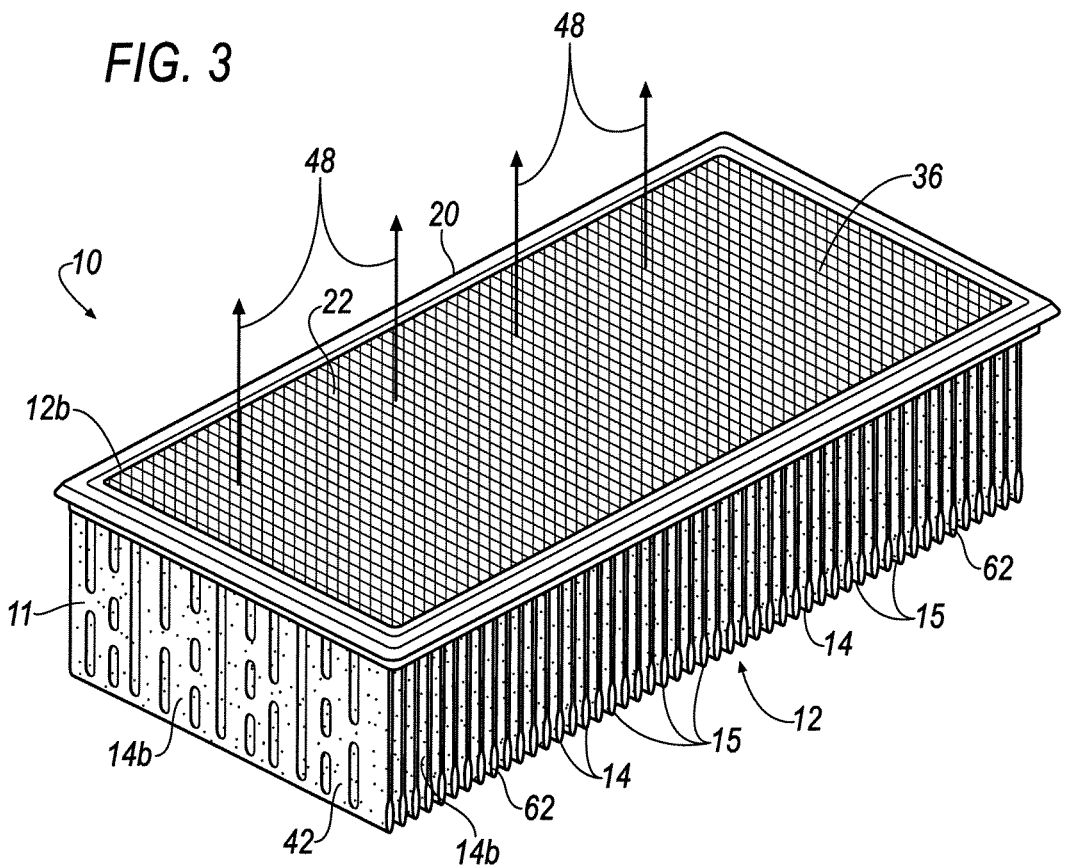
FIG. 3 is a top perspective view of the filter element in accordance with the first exemplary embodiment of the present invention.

FIGS. 1-4 depict a filter element 10 in accordance with the preferred embodiment of the present invention. The filter element 10 is a rectangular flat panel type air filter element including a pleated filter media 12 formed in the shape of a rectangular flat panel and supported by a peripheral sealing gasket 20. Preferably, the peripheral sealing gasket 20 is made of a resilient material, such as a rubber or rubber-like polymer material, e.g. polyurethane. As illustrated in FIGS. 1 and 3, the filter media 12 of the filter element 10 has a bottom dirty side 12a and a top clean side 12b. As further illustrated in FIG. 3, a top of the filter element 10 is covered by an expanded metal screen 22 which covers the clean side 12b of the filter media 12 of the filter element 10.

Figure 11:
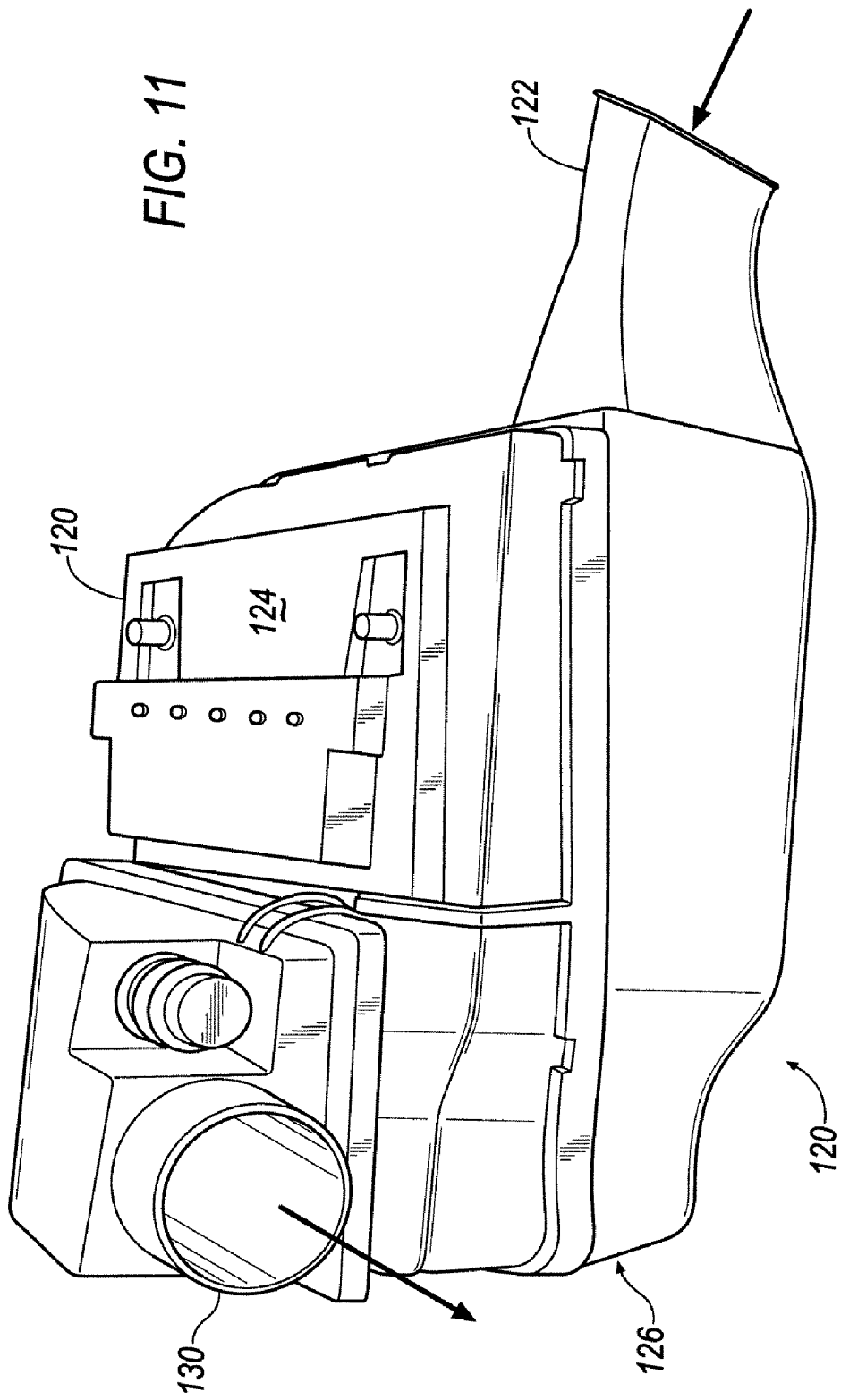
FIG. 11 is a perspective view of an air cleaner for an internal combustion engine which utilizes the filter element in accordance with the present invention.

FIG. 11 illustrates an air cleaner 120 for an internal combustion engine (not shown) in which the filter element 10 embodying the principles of the present invention is used. Dirty air enters the air cleaner 120 through an inlet 122, passes adjacent to and around a storage battery 124 and into a filter housing 126. The peripheral sealing gasket 20 seals the pleated filter media 12 in the filter housing 126 in a conventional manner. The dirty air then rises through the dirty side 12a of the filter media 12 (shown in FIG. 1) within the filter housing 126 as well as passing laterally through the sides of the filter media 12. Cleaned air passes through the clean side 12b (shown in FIG. 3) of the filter media 12 and out of an outlet 130 for combustion by the associated engine.

The pleated filter media 12 is comprised of a web of a fluid pervious filter media material 11 pleated so as to form a plurality of pleats 14 defining a plurality of peaks 15 and valleys 16 which, in turn, have spaces (or gaps) 17 therebetween. Dirty intake air flows both transversely through the dirty side 34 of the filter media 12 and laterally between the pleats 14. The peaks 15 occur in a plane which defines a dirty-side face 12a of the filter media 12, while the valleys 16 occur in a plane which defines a clean-side face 36 of the filter media 12.

Figure 4:
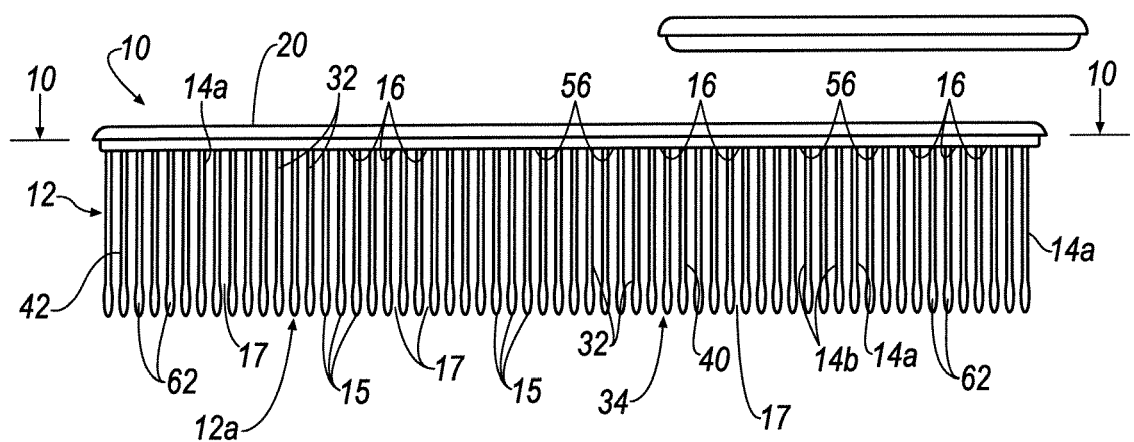
FIG. 4 is a side view of the filter element in accordance with the first exemplary embodiment of the present invention.

Each of the pleats 14 is formed by a spaced pair of a first panel 14a and a second panel 14b separated by a fold defining the peak 15. Consequently, the first and second panels 14a and 14b, respectively, have clean sides and dirty sides separated by the folds (or peak) 15. Both the first panel 14a and the second panel 14b are generally flat and extend in a generally parallel relation to one another with a spacing (or gap) 18 therebetween whereby the air flow 38 flows through the first and second panels 14a and 14b from the dirty side 12a of the filter media 12 into the spacing 18 and exits from the clean side 12b of the filter media 12, thereby depositing foreign matter on the dirty side 12a (the outwardly facing surfaces) of the first and second panels 14a and 14b of the pleats 14, as best seen in FIG. 4. Moreover, the first and second panels 14a and 14b of the pleats 14 are at least partially closed adjacent first and second edges 30 and 32 of the pleated filter media 12. The first and second panels 14a and 14b of the pleats 14 have dirty sides 40 and 42, respectively, facing the dirty-side face 34 of the filter media 12, and clean sides 66 and 68, respectively, facing the clean-side face 36 of the filter media 12. In other words, the dirty sides 40 and 42 of the first and second panels 14a and 14b of the pleats 14 define the dirty side 12a of the filter media 12, while the clean sides 66 and 68 of the first and second panels 14a and 14b of the pleats 14 define the clean side 12b of the filter media 12.

Thus, as illustrated, the first and second panels 14a and 14b face one another on both the clean sides 66, 68 and dirty sides 40, 42 when the web 11 is folded in opposite directions to form the pleated filter media 12 having the peaks 15 and valleys 16 extending transversely with respect to the edges 30 and 32.

In accordance with the principles of the present invention and as shown in FIG. 1, dirty air enters the filter media in directions transverse to the dirty-side face 34 as indicated by arrows 38 and laterally to the dirty-side face 34 through the dirty sides 40 and 42 of the first and second panels 14a and 14b, respectively, in the directions of arrows 44 and 46. As seen in FIG. 3, clean air exits the filter element 10 through the clean side face 36 in the direction of arrows 48. The peaks 15 and valleys 16 are determined by the direction 38 of dirty air flow through the filter media 12 so that the peaks 15 are at the bottom and the valleys 16 are above the peaks 15.

Referring now to FIGS. 4-7 showing side and end views of the filter element 10, it is seen that the pleats 14 formed by the first and second panels 14a and 14b are adhered only at their edges 30 and 32, as illustrated in FIG. 1. Consequently, the gaps 17 are maintained between adjacent pleats 14. Accordingly, dirty air can pass laterally between the pleats 14 in the direction of arrows 44 and 46, as shown in FIG. 1. Spacing is maintained between the pleats 14 adjacent the edges 30 and 32 by having substantially flat or obtuse valley floors 56 to keep the edges 30 and 32 of the pleats 14 spaced from one another, and by having an array of first spaced, elongated embossments 60 projecting (or extending) from the dirty side 12a of the pleated filter media 12. The first elongated embossments 60 extend generally in the direction from the peaks 15 to the valleys 16 of the pleats 14 (shown in FIGS. 6-10). More specifically, the first elongated embossments 60 protrude from the dirty side 40 and 42 of the first and second panels 14a and 14b away from the clean sides 66 and 68 thereof. The first elongated embossments 60 have spaces 64 therebetween to allow dirty air to continually pass laterally between the dirty sides of the first and second panels 14a and 14b of the pleated filter media 12. The dirty sides 40 and 42 of the panels 14a and 14b are kept separated by the first elongated embossments 60 which abut unembossed portions of the first and second panels 14a and 14b to define the gaps 17 therebetween so that dirty air in the direction 38 could flow from the peaks 15 through the pleats 14.

Figure 5:
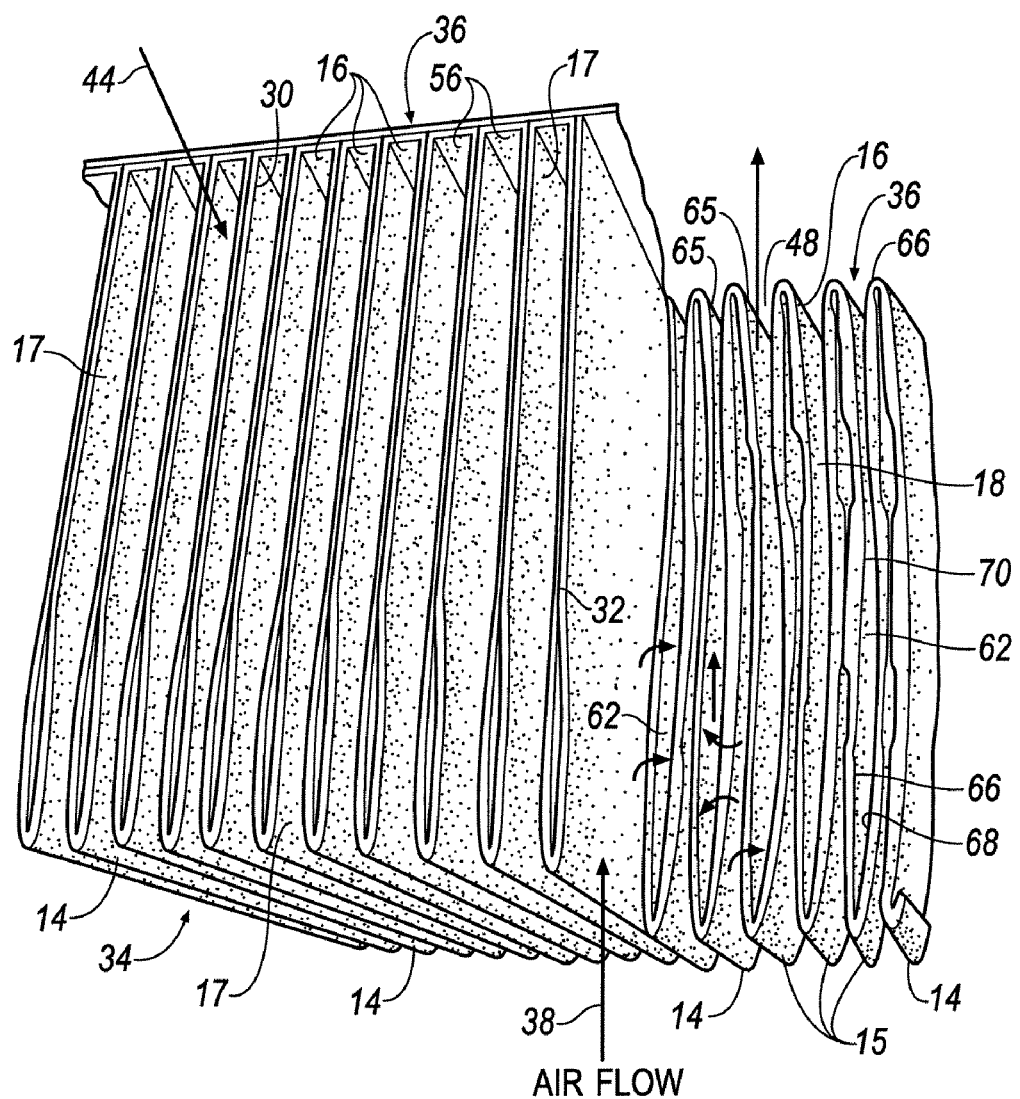
FIG. 5 is a bottom perspective view of the filter element of FIGS. 1-4 showing a portion of the filter media cut away.

Referring now mainly to FIG. 5, where the filter media 12 has been severed through the pleats 14 to reveal pockets 62 between the panels 14a and 14b, which open upwardly through openings 65 which coincide with the clean-side face 36 of the filter element 10. The substantially closed pockets 62 are formed by the closed edges 30 and 32. As with the dirty sides 40 and 42 of the panels 14a and 14b, the clean sides 66 and 68 of the panels 14a and 14b are kept separated by an array of second spaced, elongated embossments 70 protruding from the clean sides 66 and 68 of the first and second panels 14a and 14b into the pockets 62. The second elongated embossments 70 extend generally in the direction from the peaks 15 to the valleys 16 of the pleats 14. The second elongated embossments 70 have spaces 74 therebetween to allow the cleaned air to continually pass laterally between the clean sides of the first and second panels 14a and 14b of the pleated filter media 12.

As with the dirty sides 40 and 42 of the panels 14a and 14b, the second elongated embossments 70 abut unembossed portions of the first and second panels 14a and 14b to define the gaps 18 therebetween so that clean air in a direction 48 flows from the peaks 20 toward the openings 65, and is channeled by the second elongated embossments 70. If necessary the clean air can pass laterally through the gaps 18 between the second elongated embossments 70 so as to even out clean air flow and make it more laminar, which is desirable if the clean air is combustion air for an internal combustion engine.

As will be explained hereinafter, the first and second elongated embossments 60 and 70 cooperate not only to keep the pleats 14 in spaced relation, but also to stiffen the pleats 14 and distribute air over the pleats 14 in an even fashion so as to increase the capacity of the filter media 12 while reducing restriction.

Figure 8:
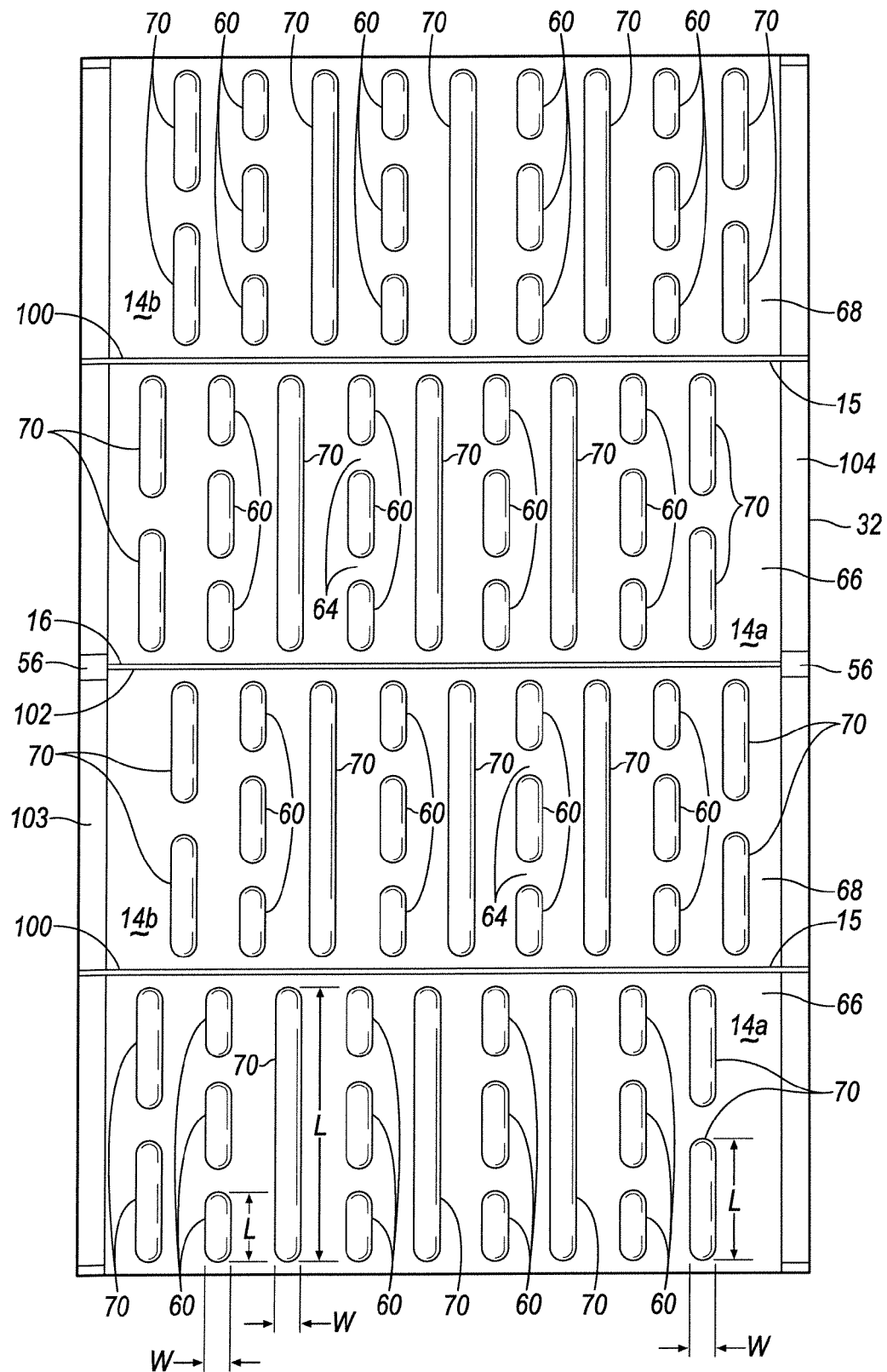
FIG. 8 is a planar view of the clean side of the filter media of the present invention before being pleated.
Figure 9:
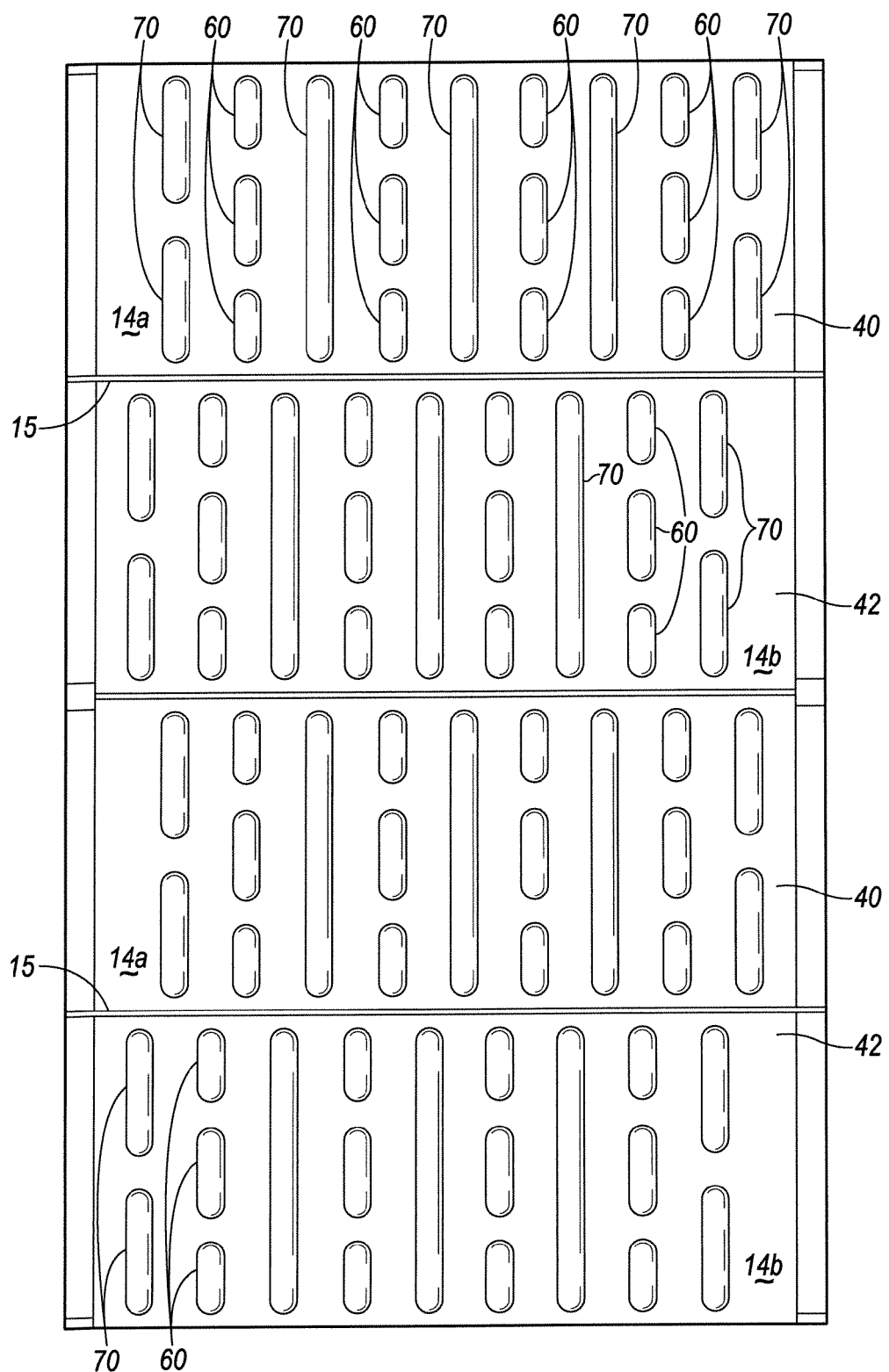
FIG. 9 is a planar view of the dirty side of the filter media of the present invention before being pleated.
Figure 10:
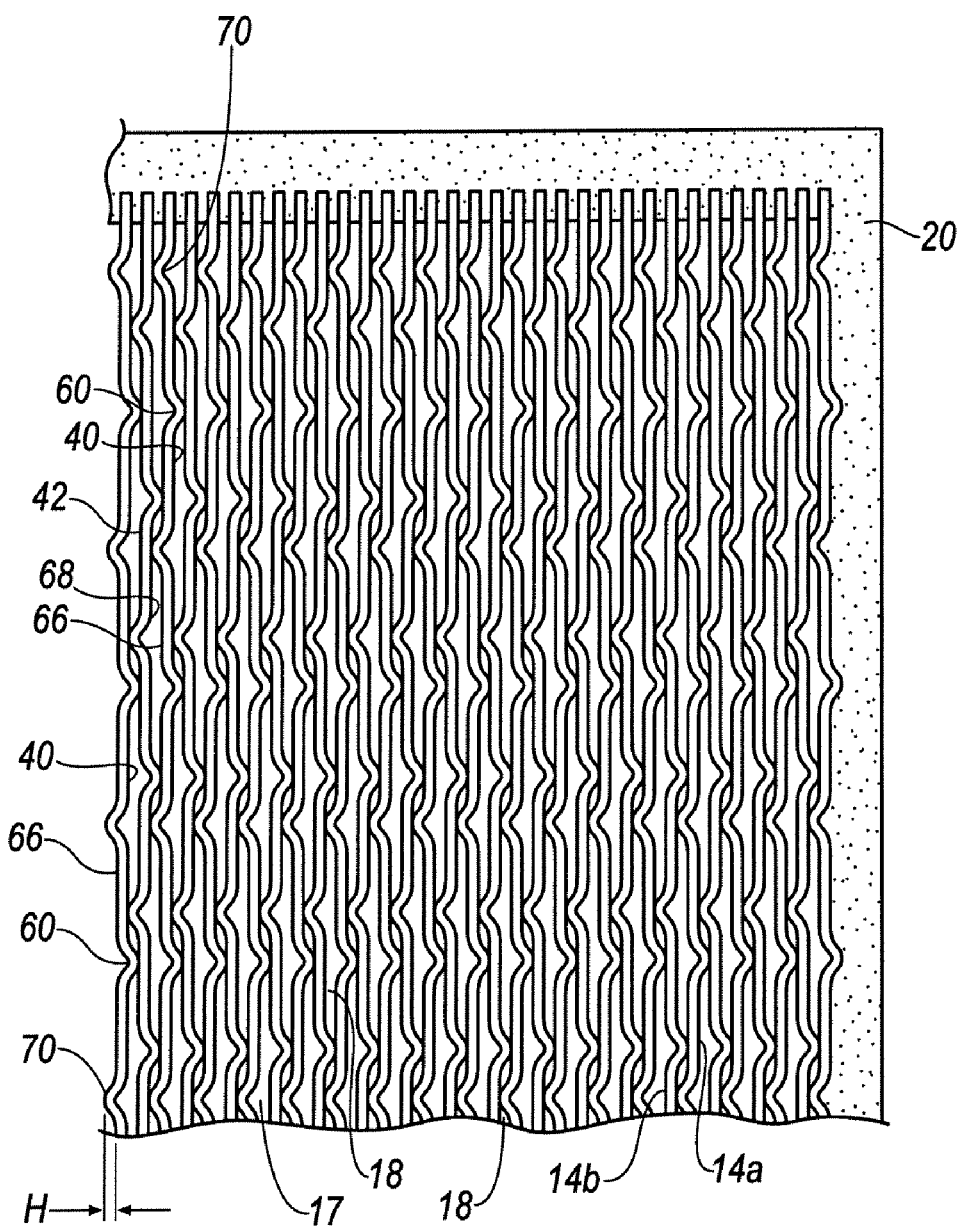
FIG. 10 is an enlarged cross-sectional partial view taken along lines 10-10 of FIG. 4.

Furthermore in accordance with the present invention, the elongated embossments 60 and 70 are formed alternately along the width of the first and second panels 14a and 14b, as illustrated in FIGS. 8 and 9. Moreover, as further illustrated in FIGS. 8 and 9, the elongated embossments 60 and 70 on the first panel 14a are formed with offset relative to the elongated embossments 60 and 70 on the second panel 14b. Thus, the present invention utilizes an emboss pattern that offsets the elongated embossments 60 and 70 on the adjacent pleat panels. In other words, the elongated embossments 60 and 70 of the adjacent pleat panels do not abut each other when adjacent pleats 14 move toward each other, but rather unembossed portions of the first and second panels 14a and 14b, as illustrated in FIGS. 2 and 10.

Each of the elongated embossments 60 and 70 is characterized by a length L, a width W and a height H. As illustrated in FIG. 8, the lengths L of the embossments 60 and 70 is bigger than the widths W thereof. Preferably, the embossments 60 have different lengths L. Alternatively, the embossments 60 may have substantially equal lengths L. The elongated embossments 60 and 70 have substantially identical height H, as shown in FIG. 10.

Figure 6:
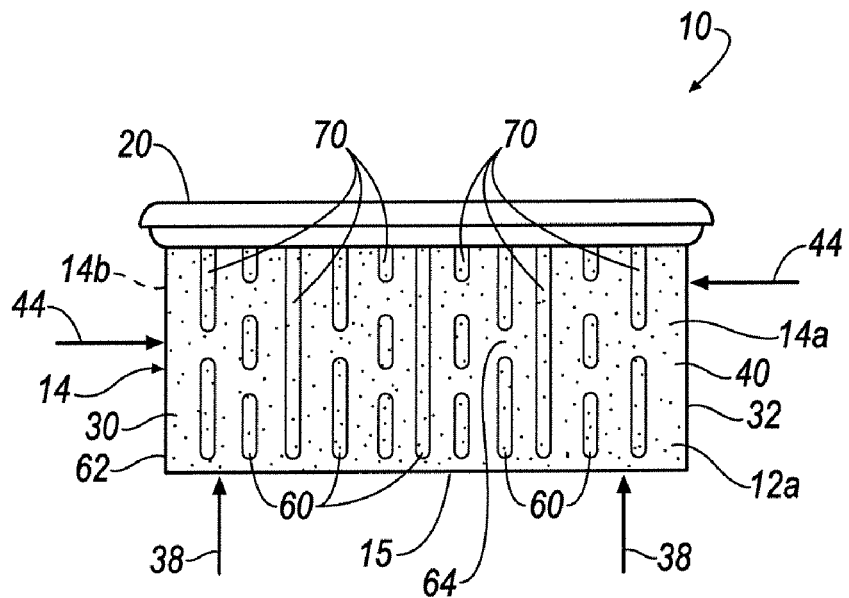
FIG. 6 is a first end view of the filter element showing a first panel.
Figure 7:
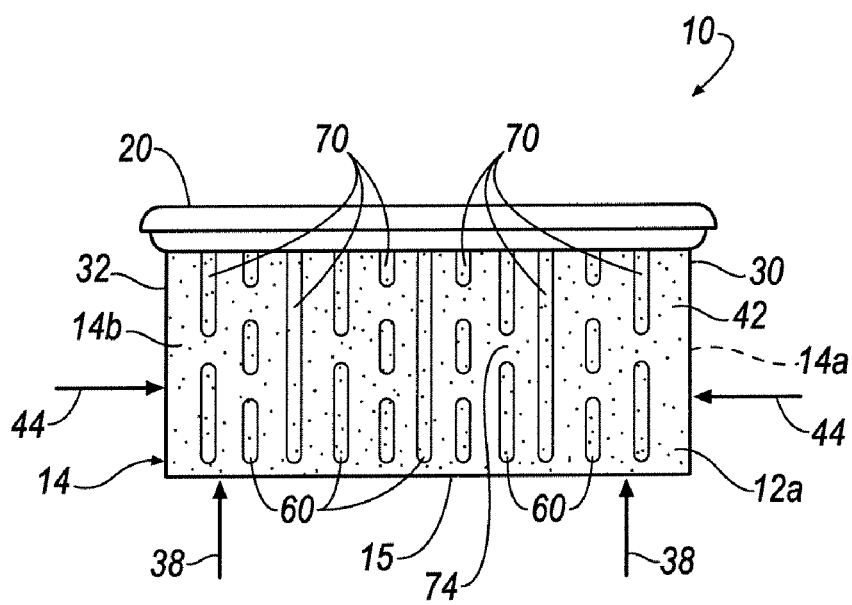
FIG. 7 is a second end view of the filter element showing a second panel.

Referring now mainly to FIGS. 6 and 7 as well as FIG. 5 wherein end views of the filter element 10 reveal embossment structure, it is seen that the first and second panels 14a and 14b have the arrays of spaced, elongated embossments 60 and 70 that respectively keep the pleats 14 spaced from one another and keep the pleats open to define the interior pockets 62 (FIG. 5). The first panel 14a and the second panel 14b are substantially identical with the exception that the elongated embossments formed on the first panel 14a are transversely offset relative to the elongated embossments formed on the second panel 14b, as shown in FIGS. 8 and 9, so that when the first and second panels are folded at the peaks 15, the array of the second elongated embossments 70 abut unembossed portions of the clean sides 66 and 68 of the panels 14a and 14b within the pocket 62 with the gaps 18 therebetween, while the array of the first elongated embossments 60 abut unembossed portions of the dirty sides 40 and 42 of the panels 14a and 14b with the gap 17 therebetween, as shown in FIGS. 5 and 10.

Referring now to FIG. 8 where the clean sides 66 and 68 of the filter media 12 are shown prior to folding the media web 12 at peaks 20 and valleys 22, it is seen that upon folding the filter media material 11, the second spaced embossments 70 abut the unembossed portions of the clean sides 66 and 68 of the panels 14a and 14b within the pockets 62 of FIG. 5. The gaps 18 occur between the spaced embossments 70 and the unembossed portions of the clean sides 66 and 68 of the panels 14a and 14b. Upon folding the filter media 12 so that the panels 14a and 14b have clean-side surfaces 66 and 68 in abutment and then adhering the edges 30 and 32 to one another with beads of adhesive, the interior pockets 62 of FIG. 5 are created. When folded, the second elongated embossments 70 channel and direct air through the clean-side face 12b and between the sides edges 30 and 32 through labyrinth channels on the clean side of the filter media 12 formed between the second elongated embossments 70 and the unembossed portions of the clean sides 66 and 68 of the panels 14a and 14b.

Referring now to FIG. 9, the first elongated embossments 60 project from the dirty sides 40 and 42 of the first and second panels 14a and 14b. These embossments also abut the unembossed portions of the dirty sides 40 and 42 of the panels 14a and 14b when folded to help keep the pleats 14 separated to provide the gaps 17 therebetween (see FIGS. 4 and 5). When folded, the first elongated embossments 60 channel and direct air through the dirty-side face 12a and between the sides edges 30 and 32 through labyrinth channels on the dirty side of the filter media 12 formed between the first elongated embossments 60 and the unembossed portions of the dirty sides 40 and 42 of the panels 14a and 14b.

As is seen in FIGS. 8 and 9 where the filter media 12 is shown flat prior to folding at creases 100 and 102 to form the peaks 15 and valleys 16, it is seen that first and second panels 14a and 14b are embossed with offset so that upon folding, the appropriate embossments face one another with offset and abut the unembossed portions of the first and second panels 14a and 14b to provide interior and exterior spacing. As is seen in FIG. 8, at least the first panels 14a have beads of adhesive 103 and 104 proximate edges 30 and 32, respectively. The panels 14a and 14b are folded along the creases 100 and 102 to form the peaks 15 and beads 103 and 104 adhering the edges 30 and 32 of the panels 14a and 14b together so as to form the pockets 62 shown in FIG. 5. Each valley 16 has the flattened area 56 at each end in order to help keep the edge portions 30 and 32 of adjacent panels 14a and 14b separate. In that the sealing gasket 20 is molded around the filter media 12, the material of the sealing gasket 20 engages and wedges adjacent the flattened panel portion 56 to help stiffen the base portion of the filter media formed by the valleys 16.

The aforedescribed filter element 10 has use as a panel air filter for internal combustion engines. Since the height of the pleats is greater than 2 inches, the various elongated embossments 60 and 70 described provide stiffness as well as spacing. Preferably, a ratio of pleat height to media calipar (thickness) greater than 200 and a pleat density (spacing) is greater than 7 pleats per inch. Further preferably, the height of the embossments is greater than one-half the gap between the adjacent pleats as defined by the pleat density.

While the filter element 10 is shown being used to filter air, the structure of the filter media 12 and the filter element 10 is usable to filter other gases as well as fluids in general including liquids, such as motor oil or other lubricants, and fuel. Furthermore, although the filter element 10 according to the preferred embodiment of the present invention has rectangular panel configuration, it will be appreciated that the filter element of the present invention may have any appropriate configuration, such as cylindrical, frustoconical, etc.

The foregoing description of the preferred embodiment of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A filter element, comprising:
   a pleated filter media including a plurality of pleats, wherein each pleat of the plurality of pleats includes
   a first panel, and
   a second panel, wherein the first panel and the second panel each include a first side, a second side opposite the first side, and a plurality of elongated embossments that extend outwardly from each of the first side and the second side of the first panel and second panel, and a plurality of unembossed portions between each elongated embossment, wherein two or more of the plurality of elongated embossments of a first pleat of the plurality of pleats abuts two or more of the plurality of unembossed portions a second pleat, and, wherein two or more of the plurality of elongated embossments of the second pleat of the plurality of pleats abuts two or more of the plurality of unembossed portions of the first pleat to define adjacent pleats, wherein the adjacent pleats define two or more gaps between the first and second pleats, wherein the two or more gaps are asymmetrical according to an axis of symmetry extending through each of the two or more of the plurality of elongated embossments of the first and second pleats.

2. The filter element according to claim 1, wherein the plurality of elongated embossments extend from the first and second sides in an oscillating pattern.

3. The filter element according to claim 1, wherein said plurality of elongated embossments of said first and second panels define in an offset relationship with respect to one another such that said plurality of elongated embossments of said first panel define an abutting relationship with said plurality of unembossed portions of said second panel, and said plurality of elongated embossments of said second panel define an abutting relationship with said plurality of unembossed portions of said first panel.

4. The filter element according to claim 3, wherein the abutting relationship of the first and second panels defines two or more gaps between each of the first and second panels.

5. The filter element according to claim 4, wherein the two or more gaps are asymmetrical according to an axis of symmetry extending through each of said plurality of elongated embossments of the first and second panels.

6. The filter element according to claim 4, wherein one of the asymmetrical gaps includes a surface segment of the first panel including
portion of one of said plurality of unembossed portions; and
a surface segment of the second panel including
a portion of one of said plurality of elongated embossments, and
a portion of one of said plurality of unembossed portions.

7. The filter element according to claim 4, wherein one of the asymmetrical gaps includes a surface segment of the first panel including
a portion of one of said plurality of elongated embossments, and
a portion of one of said plurality of unembossed portions; and
a surface segment of the second panel including
a portion of one of said plurality of elongated embossments, and
a portion of one of said plurality of unembossed portions.

8. The filter element according to claim 4, wherein one of the asymmetrical gaps includes a surface segment of the first panel including
a portion of one of said plurality of elongated embossments, and
a portion of two of said plurality of unembossed portions; and
a surface segment of the second panel including
a portion of one of said plurality of elongated embossments, and
a portion of one of said plurality of unembossed portions.

9. The filter element according to claim 4, wherein one of the asymmetrical gaps includes
a surface segment of the first panel including a portion of two of said plurality of elongated embossments, and
a portion of two of said plurality of unembossed portions; and
a surface segment of the second panel including
a portion of two of said plurality of elongated embossments, and
a portion of two of said plurality of unembossed portions.

10. A filter element, comprising:
a pleated filter media including a first end panel, a second end panel, and one or more intermediate panels between the first and second end panels, wherein each of the first end panel, the second end panel, and the one or more intermediate panels include a first side and a second side opposite the first side, a plurality of elongated embossments that extend outwardly from each of the first side and the second side; and a plurality of unembossed portions between each elongated embossment, wherein said plurality of elongated embossments of said one or more intermediate panels abut said unembossed portions of said first and second end panels to define said pleated filter media to include at least three or more successive panels that adjacently contact one another, wherein said one or more intermediate panels includes at least two intermediate panels, wherein an elongated embossment of each of the at least two intermediate panels abut an unembossed portion of the other of the at least two intermediate panels, wherein the abutting relationship of the first or second end panel and one of said one or more intermediate panels, or, the abutting relationship of said at least two intermediate panels defines two or more gaps therebetween, wherein the two or more gaps are asymmetrical according to an axis of symmetry extending through each of said plurality of elongated embossments.

11. The filter element according to claim 10, wherein the plurality of elongated embossments extend from the first and second sides in an oscillating pattern.

12. A filter element, comprising:
a pleated filter media including a plurality of pleats, wherein each pleat of the plurality of pleats includes
first panel, and
a second panel, wherein the first panel and the second panel each include a first side, a second side opposite the first side, and a plurality of elongated embossments that extend outwardly from each of the first side and the second side of the first panel and second panel, and a plurality of unembossed portions between each elongated embossment, wherein said plurality of elongated embossments of said first and second panels define in an offset relationship with respect to one another such that
said plurality of elongated embossments of said first panel define an abutting relationship with said plurality of unembossed portions of said second panel, and
said plurality of elongated embossments of said second panel define an abutting relationship with said plurality of unembossed portions of said first panel, wherein two or more of the plurality of elongated embossments of a first pleat of the plurality of pleats abuts two or more of the plurality of unembossed portions a second pleat, and, wherein two or more of the plurality of elongated embossments of the second pleat of the plurality of pleats abuts two or more of the plurality of unembossed portions of the first pleat to define adjacent pleats, wherein the adjacent pleats define two or more gaps between the first and second pleats, wherein the two or more gaps are asymmetrical according to an axis of symmetry extending through each of the two or more of the plurality of elongated embossments of the first and second pleats.

13. The filter element according to claim 12, wherein the plurality of elongated embossments extend from the first and second sides in an oscillating pattern.

14. A filter element, comprising:
a pleated filter media including a plurality of pleats, wherein each pleat of the plurality of pleats includes
a first panel, and
a second panel, wherein the first panel and the second panel each include a first side, a second side opposite the first side, and a plurality of elongated embossments that extend outwardly from each of the first side and the second side of the first panel and second panel, and a plurality of unembossed portions between each elongated embossment, wherein said plurality of elongated embossments of said first and second panels define in an offset relationship with respect to one another such that
said plurality of elongated embossments of said first panel define an abutting relationship with said plurality of unembossed portions of said second panel, and
said plurality of elongated embossments of said second panel define an abutting relationship with said plurality of unembossed portions of said first panel, wherein the abutting relationship of the first and second panels defines two or more gaps between each of the first and second panel, wherein the two or more gaps are asymmetrical according to an axis of symmetry extending through each of said plurality of elongated embossments of the first and second panels.

15. The filter element according to claim 14, wherein the plurality of elongated embossments extend from the first and second sides in an oscillating pattern.

16. The filter element according to claim 14, wherein two or more of the plurality of elongated embossments of a first pleat of the plurality of pleats abuts two or more of the plurality of unembossed portions a second pleat, and, wherein two or more of the plurality of elongated embossments of the second pleat of the plurality of pleats abuts two or more of the plurality of unembossed portions of the first pleat to define adjacent pleats.

17. The filter element according to claim 14, wherein one of the asymmetrical gaps includes:
a surface segment of the first panel including
a portion of one of said plurality of unembossed portions; and
a surface segment of the second panel including
a portion of one of said plurality of elongated embossments, and
a portion of one of said plurality of unembossed portions.

18. The filter element according to claim 14, wherein one of the asymmetrical gaps includes:
a surface segment of the first panel including
a portion of one of said plurality of elongated embossments, and
a portion of one of said plurality of unembossed portions; and
a surface segment of the second panel including
a portion of one of said plurality of elongated embossments, and
a portion of one of said plurality of unembossed portions.

19. The filter element according to claim 14, wherein one of the asymmetrical gaps includes:
a surface segment of the first panel including
a portion of one of said plurality of elongated embossments, and
a portion of two of said plurality of unembossed portions; and
a surface segment of the second panel including
a portion of one of said plurality of elongated embossments, and
a portion of one of said plurality of unembossed portions.

20. The filter element according to claim 14, wherein one of the asymmetrical gaps includes:
a surface segment of the first panel including
a portion of two of said plurality of elongated embossments, and
a portion of two of said plurality of unembossed portions; and
a surface segment of the second panel including
a portion of two of said plurality of elongated embossments, and
a portion of two of said plurality of unembossed portions.

* * * * *

UNITED STATES PATENT AND TRADEMARK OFFICE
CERTIFICATE OF CORRECTION

PATENT NO.        : 7,425,227 B1
APPLICATION NO.   : 11/152240
DATED             : September 16, 2008
INVENTOR(S)       : Christopher D. Hutchison et al.

It is certified that error appears in the above-identified patent and that said Letters Patent is hereby corrected as shown below:

In claim 6, column 7, line 34, please add "a" before "portion";
In claim 12, column 8, line 43, please add "a" before "first panel".

Signed and Sealed this

Thirteenth Day of January, 2009

JON W. DUDAS
*Director of the United States Patent and Trademark Office*